United States Patent Office 3,214,239
Patented Oct. 26, 1965

3,214,239
RECOVERY OF METAL VALUES FROM AQUEOUS SOLUTION BY SOLVENT EXTRACTION WITH AN ORGANO PHOSPHORUS EXTRACTANT
Wayne C. Hazen and Angus V. Henrickson, Wheat Ridge, Colo., assignors to Kerr-McGee Oil Industries, Inc., a corporation of Delaware
No Drawing. Filed July 2, 1962, Ser. No. 207,015
18 Claims. (Cl. 23—14.5)

This invention relates to the recovery of desired metal values from their ores and other source materials. In some of its more specific aspects, the invention further relates to the recovery of uranium and/or vanadium values from aqueous solution by solvent extraction with an organophosphorus extractant. The invention also relates to a novel process for reducing the oxidation of ferrous ion to ferric ion absorbed by an organo-phosphorus extractant.

One prior art method of treating vanadium ores is leaching with aqueous sulfuric acid to thereby provide an acidic leach liquor. This method may be used for vanadium-containing ores having other substances as a main constituent, including carnotite uranium ores. The uranium may be recovered with ion exchange materials and the resultant uranium-barren acid leach liquor contains varying amounts of substances together with the vanadium including iron and aluminum.

Recovery of vanadium values from such leach liquors has been difficult and incomplete when practicing prior art recovery processes. Precipitation techniques have been employed with some degree of success but recovery is poor and interference arises from the iron and aluminum impurities, thereby resulting in a product of decreased value. As a result, solvent extraction processes for the recovery of vanadium from aqueous acid solutions have been developed in recent years. The more satisfactory extractants for vanadium have been found to be organophosphorus compounds which may be dissolved in a suitable inert water immiscible solvent. The extractant is intimately contacted with an aqueous solution of vanadium values in accordance with prior art practices to thereby absorb or extract the vanadium values and largely reject undesirable associated impurities such as iron and aluminum.

Iron is an especially undesirable contaminant when present in the aqueous solution in the ferric state as it is strongly extracted by organo-phosphorus extractants. For example, ferric ion is very strongly extracted by the extraction solvent and interferes with a uranium or vanadium extraction step since it lowers the effective solvent strength thereby reducing the capacity of a given amount of solvent. Extraction of ferric ion also interferes with complete cleanup of the extraction solvent and the ferric ion content tends to build up to undesirable levels. It is therefore important that maximum ferric ion rejection be achieved in the solvent extraction circuit. For this reason, the feed liquor to a vanadium solvent extraction circuit often is reduced with a reducing agent such as sulfur dioxide to thereby provide a very low E.M.F. and reduce substantially all of the ferric ion content to the ferrous state.

In stripping uranium from a loaded extractant with aqueous soda ash, the absorbed iron is also stripped and the extractant is satisfactorily regenerated for recycle. However, the resulting iron oxide will contaminate the yellow cake product unless it is filtered off in a difficult filtration step. Stripping of vanadium usually is carried out with warm 10–20% sulfuric acid and unfortunately this does not strip the ferric ion completely. Ferric ion slowly builds up in the solvent and it is less capable of extracting a maximum amount of vanadium. Therefore, the capacity of the solvent for vanadium is reduced due to the ferric ion content and the "effective strength" of the solvent is no longer the actual strength of the solvent. A solvent of low effective strength due to ferric ion poisoning may leave high vanadium levels in the raffinate, cause excess iron in the acid stripping solution, and contaminate the vanadium oxide product precipitated from such a vanadium liquor.

It is known that ferrous ion is not oxidized to the ferric state by aeration in aqueous acidic solution containing uranium or vanadium values. On the other hand, it has been discovered unexpectedly that intimately mixing a totally reduced solution of the above type with an organophosphorus extraction solvent and aerating will result in a large increase in ferric ion in the loaded solvent. This is surprising, since mixing the organo-phosphorus extraction solvent with a substantially pure ferrous solution and aerating at the same pH will not result in oxidation of a substantial amount of iron to the ferric state.

It has been discovered that contacting a reduced leach liquor with an organo-phosphorus extractant seems to extract a small amount of ferrous ion along with the desired metal value. The distribution coefficient for ferrous ion is not large enough to give trouble, but it has been found to be independent of the distribution coefficient for ferric ion which is very high. During the extraction step, normally the solvent extraction is mixed with the leach liquor intimately and it is in contact with air. Surprisingly, extraction under these conditions results in oxidation of the ferrous ion held or absorbed by the solvent to ferric ion. The ferric ion thus formed is tightly held by the solvent and the ferrous ion content is depleted. It is then possible to extract additional ferrous ion, which is in turn air oxidized and the cycle repeated. Eventually, a high concentration of ferric ion is present in the solvent extractant even though initially there was almost no ferric ion in the aqueous solution or the solvent extractant.

It has been further discovered that the oxidation of ferrous ion to ferric ion under the above conditions may be sharply reduced or even prevented by providing a vapor space above the aqueous solution to be extracted, and supplying a non-oxidizing gas to the vapor space to thereby maintain a non-oxidizing atmosphere therein. Even better results may be obtained by providing a vapor space above the loaded extractant which is separated from the aqueous phase and stripped, and also supplying a non-oxidizing gas thereto to maintain a non-oxidizing atmosphere. By thus preventing oxidation of the ferrous ion content of the leach liquor, it is possible to overcome the above-mentioned disadvantages of ferric ion.

It is an object of the present invention to provide an improved process for solvent extracting metal values from their aqueous solution in the presence of ferrous ion whereby interference and contamination due to iron may be reduced.

It is a further object to provide an improved process for recovering uranium and/or vanadium values from aqueous solutions which contain ferrous ion by solvent extraction with an organo-phosphorus extractant in an inert organic water immiscible solvent whereby interference and contamination due to iron may be substantially reduced.

It is still a further object of the present invention to provide a novel process for reducing the oxidation of ferrous ion to ferric ion absorbed by an organo-phosphorus compound.

Still other objects and advantages of the invention will be apparent to those skilled in the art upon reference to the following detailed description and the examples.

The present invention will be described hereinafter with specific reference to the solvent extraction of vanadium in the plus 4 oxidation state from aqueous solutions containing the same and ferrous ion. However, it will be recognized that the invention may be practiced for the recovery of other metal values from aqueous solution utilizing the organo-phosphorus compounds defined hereinafter as solvent extractants.

In practicing a preferred variant of the invention, a solution of the organo-phosphorus compound in a water immiscible inert organic carrier is first prepared. The diluent to be used should meet certain requirements such as immiscibility with the aqueous solution, an ability to dissolve the organo-phosphorus compound and the extracted metal complex, freedom from interfering reaction with the organo-phosphorus compound, and a density allowing ready separation from the aqueous phase. Examples of suitable inert carriers are hydrocarbons such as benzene, toluene, cyclohexane, hexane or octane, paraffinic or aromatic hydrocarbon distillates such as light or heavy naphthas, and chlorinated solvents such as carbon tetrachloride or perchloroethylene. The preferred inert carrier for economic reasons is high flash point kerosene or other suitable petroleum distillates boiling within the kerosene range.

A wide variety of organo-phosphorus compounds which are known to be satisfactory for extracting uranium, vanadium, copper, zinc or other desired metal values from their aqueous solutions may be used in practicing the present invention. Examples of organo-phosphorus compounds include mono-organo phosphoric acid esters of the general formula

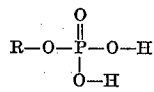

diorgano phosphoric acid esters of the general formula

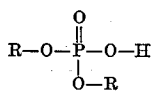

organo pyrophosphates of the general formula

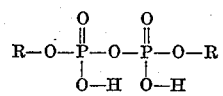

organo phosphonic acids of the general formula

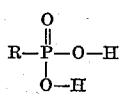

and diorgano phosphinic acids of the general formula

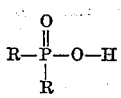

where R is a monovalent organic radical selected from the group consisting of alkyl radicals, cycloalkyl radicals, aryl radicals and aralkyl radicals. The organo phosphorus compound should contain at least 8 carbon atoms and usually for better results 16 to 20 carbon atoms. Preferably, the organo radicals should contain at least 6 carbon atoms and for best results at least 8 carbon atoms, but often up to 12–16 or 20 carbon atoms are satisfactory.

The concentration of the organo phosphorus compound in the inert carrier may vary over a considerable range. For example, the extraction solution may contain 1–30% by weight of the organo phosphorus compound with the remainder being water immiscible inert organic carrier. If desired, more than one organo phosphorus compound may be present, or promoters or synergistic agents may be added to the solution. In some instances, higher percentages of the organo phosphorus compound may be used such as up to 50% by weight or higher. However, this is not usually desirable.

The extractant is intimately contacted with the aqueous solution containing the desired metal values and ferrous ion as an impurity to produce a loaded extractant. The loaded extractant is then separated from the aqueous solution and intimately contacted with a stripping agent to recover the desired metal values therefrom, and the stripped extractant recycled in the process.

In practicing the present invention for the extraction of vanadium from an acid leach liquor containing vanadium values in the plus 4 oxidation state, it is preferred that the extractant be a kerosene solution of di-2-ethyl hexyl phosphoric acid. Usually a concentration of about 8–12%, and preferably about 10% is used. The extractant is contacted with the aqueous solution of vanadium values at a pH of 1.4 to 3.0 after first reducing the ferric ion content to the ferrous state. The ferric ion may be reduced by contacting the solution with metallic iron, by addition of sulfur dioxide in the presence of a water soluble thiocyanate such as described in U.S. Patent 2,959,462, or by other methods well known to the art which assure that substantially no ferric ion remains in the solution.

The water immiscible extraction solution is brought into intimate contact with the acidic vanadium-bearing leach liquor by any suitable means such as in a countercurrent extraction unit and for such period of time as is necessary to effect extraction of the vanadium content. A pH value for the leach liquor between 1.4 and 3.0 has been found to be very satisfactory, but even better results may be obtained when the pH value is between about 1.5 and 1.8.

The extraction step may be carried out at a temperature of at about 90–120° F. in instances where there is a pronounced tendency toward emulsion formation. However, the temperature should not be sufficiently elevated to cause a substantial amount of hydrolysis of the di-2-ethyl hexyl phosphoric acid.

After the extractant has been contacted with the aqueous solution for a period of time sufficient to extract the vanadium content, the resultant vanadium loaded extractant is separated. The vanadium content of the loaded extractant may be recovered by stripping with about 10–20% aqueous sulfuric acid or other satisfactory mineral acid. The stripped extractant may be separated from the stripping solution and recycled to extract additional vanadium.

A commercial grade of vanadium may be obtained from the mineral acid strip solution by various well known methods. One method comprises oxidizing the tetravalent vanadium content of the mineral acid strip solution to pentavalent vanadium with an oxidizing agent such as sodium chlorate, and then adjusting the acid strength to effect precipitation of the vanadium as the oxide ($V_2O_5$). Other methods of obtaining vanadium concentrates are known and the specific method employed does not comprise a part of this invention.

In accordance with the present invention, it is essential that at least the extraction step described above, in which the solution of organo-phosphorus compound is intimately mixed with the aqueous solution containing ferrous ion and desired metal values to be extracted, be carried out with a non-oxidizing atmosphere in contact with the intermixed aqueous and organic phases. Preferably, the vessel in which the aqueous and organic phases are intermixed is closed off from the atmosphere with a vapor space being provided thereabove, and non-oxidizing gas is supplied to the vapor space in quantities sufficient to assure a non-oxidizing atmosphere being maintained therein. A non-oxidizing atmosphere may be maintained in contact with the loaded extractant which is separated from the extracted aqueous solution. For example, an atmosphere which is substantially free of elemental oxygen and which is non-oxidizing with respect to ferrous ion may be continuously maintained in contact with the aqueous and organic phases during the extraction step, and then in contact with the separated organic phase until the desired metal values are stripped therefrom. This procedure prevents oxidation of ferrous ion to ferric ion following the separation of the loaded extractant from the aqueous solution prior to and during the stripping step.

Any satisfactory non-oxidizing gas may be supplied to the vapor space to maintain a non-oxidizing atmosphere therein. Examples of non-oxidizing gases include one of more inert gases such as helium, argon, nitrogen, carbon dioxide, etc., and reducing gases such as natural gas, hydrogen-containing gaseous mixtures, carbon monoxide-containing gaseous mixtures, etc. Usually it is preferred that the non-oxidizing gas be produced by combustion in air of a carbonaceous fuel such as natural gas, to thereby remove the elemental oxygen content of the air and produce a gaseous mixture which is substantially free of elemental oxygen and non-oxidizing in the environment described herein. The quantity of non-oxidizing gas supplied to the vapor space is not of importance, provided an atmosphere is maintained therein which is non-oxidizing with respect to the ferrous ion content of the loaded extractant.

As a rule, the organo-phosphorus compound, the diluent therefor, and the general operating conditions for recovering a given desired metal value from its aqueous solution may be those normally used in the prior art. Thus, prior art conditions may be followed with the exception of providing a non-oxidizing atmosphere in contact with the aqueous and organic phases during the extraction step and, if desired, above the separated organic phase prior to and during stripping.

In instances where ferric ion is a problem, usually the leach liquor is completely reduced by means of a suitable reductant such as sulfur dioxide and substantially no ferric ion is present in the solution initially. When operating with a reduced aqueous solution and practicing the present inveniton, it is possible to control the iron content in the recycled extractant and also substantially reduce the iron content in the recovered desired metal values.

Suitable conditions for the recovery of vanadium, uranium, copper, and zinc from leach liquors are well known and disclosed in U.S. Patent 2,864,668, U.S. Patent 2,992,894, and copending application Serial No. 610,715, filed September 19, 1956 now U.S. Patent No. 3,151,933, by Wayne C. Hazen and Angus V. Henrickson. Still other heavy metal values may be separated using organo-phosphorus extractants such as described above. Extraction apparatus suitable for liquid-liquid contacting of the aqueous solution and extractant is likewise well known, such as that disclosed in application Serial No. 707,368, filed January 6, 1958, by Wayne C. Hazen and Robert L. Cline, now abandoned and refiled April 3, 1962 as application Serial No. 199,208.

The process of the present invention is especially useful in the recovery of desired metal values from their aqueous solutions. It is also possible to use the principles of the invention in processes where it is desired to reduce or prevent the oxidation of ferrous ion contained in or absorbed by an organo-phosphorus compound, or solution thereof in an inert organic diluent. Thus, the present invention finds uses in numerous other fields and is not limited to hydrometallurgical processes.

The foreging detailed description and the following specific example are for purposes of illustration only, and are not intended as being limiting to the appended claims.

Example

A vanadium leach liquor containing vanadium in the tetravalent oxidation state was prepared by conventional hydrometallurgical procedures from a vanadium bearing ore. The leach liquor was found to contain an average of about 3.1 grams per liter of vanadium values calculated as $V_2O_5$, about 3.33 grams per liter of iron, and other impurities such as phosphorus, aluminum, titanium, and trace metals. Essentially all of the iron was in the ferrous oxidation state due to reducing the vanadium liquor by passing it and sulfur dioxide concurrently through a bed of activated carbon catalyst. The pH value of the liquor was about 2.

The above reduced vanadium bearing leach liquor was then extracted in a liquid-liquid extraction apparatus with a kerosene solution containing 8% by weight of di-2-ethyl hexyl phosphoric acid. The basic design for the extraction apparatus was similar to that described in application Serial No. 707,368, filed January 6, 1958, by Wayne C. Hazen and Robert L. Cline, now abandoned and refiled April 3, 1962, as application Serial No. 199,208, and air normally is in contact with the aqueous and organic phases during the extraction step. The temperature of the leach liquor and extraction solution was maintained within an operating range of 90–120° F.

The vanadium barren leach liquor from the extraction unit was sent to tailings, and the vanadium loaded kerosene extraction solution was transferred to a stripping section for vanadium stripping. The vanadium content of the loaded extractant was recovered in the stripping section by intimate contact with 10–20% aqueous sulfuric acid. The di-2-ethyl hexyl phosphoric acid was analyzed for iron and recycled in the process after determining its "effective strength."

A vanadium product was prepared from the above sulfuric acid stripping solution by sodium chlorate oxidation of the vanadium to the pentavalent state, and then adjusting the acid strength to effect precipitation of the vanadium as $V_2O_5$. The precipitate was recovered, fused, and analyzed to determine the iron content.

The tailings from the countercurrent extraction unit were analyzed for vanadium to determine the efficiency of the vanadium extraction process. Also, the iron content of the strip liquid was determined.

The above experiment was first conducted with the extraction unit being open to the atmosphere as in normal operation. Then, in a separate series of runs the vapor space above the extraction unit was closed off to the atmosphere and a non-oxidizing gas prepared by oxidation of natural gas with air was supplied thereto. The non-oxidizing gas was supplied to the vapor space in quantities sufficient to maintain a non-oxidizing atmosphere therein.

The following data were obtained:

| Substance | Normal Operation | Operation With an Inert Atmosphere |
|---|---|---|
| Iron content of extractant_____g./l___ | 2.21 | 1.20 |
| Effective extractant strength_____percent__ | 5.4 | 7.0 |
| $V_2O_5$ content remaining in raffinate_____g./l___ | 0.23 | 0.15 |
| Iron content of the strip liquor_____g./l___ | 10.8 | 7.5 |
| Iron content of the fused vanadium oxide product_____percent__ | Above 1 | 0.93 |

The above data show that operating in accordance with the present invention results in a marked improvement. The effective solvent strength is increased almost 50% above that normally existing in the prior art extraction circuit, the quantity of vanadium lost in the raffinate was reduced by about one-third, and the iron content of the solvent was reduced to only about one-half of that formerly existing. Thus, the extraction process was rendered much more efficient. Also, the resultant fused vanadium oxide product was of higher grade and therefore more valuable as a commercial product.

Still further improvement may be obtained by maintaining a non-oxidizing atmosphere in contact with the loaded extractant in the stripping circuit.

What is claimed is:

1. In a process for the recovery of metal values including the steps of intimately contacting an aqueous solution containing a dissolved substance providing ferrous ion and desired metal values to be recovered with a substantially water immiscible organic solvent extractant to produce a loaded solvent extractant phase containing absorbed ferrous ion and desired metal values, the desired metal values consisting essentially of at least one substance extractable by the said organic solvent extractant selected from the group consisting of uranium values, vanadium values, copper values, and zinc values, the aqueous solution being intimately contacted with a solution in a substantially water immiscible inert organic liquid carrier of at least one organo-phosphorus compound selected from the group consisting of mono-organo phosphoric acid esters of the general formula

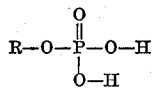

diorgano phosphoric acid esters of the general formula

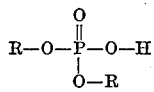

organo pyrophosphates of the general formula

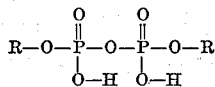

organo phosphonic acids of the general formula

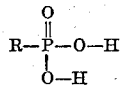

and diorgano phosphinic acids of the general formula

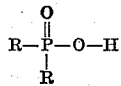

where R is a monovalent organic radical selected from the group consisting of alkyl radicals, cycloalkyl radicals, aryl radicals and aralkyl radicals and the organo phosphorus compound contains at least 8 carbon atoms, separating the resulting loaded solvent extractant phase from the aqueous solution, and intimately contacting the separated loaded solvent extractant phase with a stripping agent to recover the desired metal values therefrom, the improvement therein comprising providing a vapor space in contact with at least the aqueous solution intimately contacted with the solvent extractant and supplying a non-oxidizing gas to the vapor space to thereby maintain a non-oxidizing atmosphere therein, the atmosphere in the vapor space being non-oxidizing with respect to the ferrous ion absorbed by the solvent extractant phase.

2. The process of claim 1 wherein the aqueous solution contains vanadium values as the desired metal values to be recovered.

3. The process of claim 1 wherein the aqueous solution contains uranium values as the desired metal values to be recovered.

4. The process of claim 1 wherein the organo-phosphorus compound is a dialkyl phosphoric acid ester.

5. The process of claim 1 wherein the organo-phosphorus compound is di-2-ethyl hexyl phosphoric acid.

6. The process of claim 1 wherein an inert gas is supplied to the vapor space.

7. The process of claim 1 wherein the gas supplied to the vapor space is prepared by combustion of a carbonaceous fuel with air.

8. The process of claim 1 wherein the aqueous solution contains uranium values as the desired metal values to be recovered and the organo-phosphorus compound is a dialkyl phosphoric acid ester.

9. The process of claim 1 wherein the aqueous solution contains substantially no ferric ion.

10. The process of claim 1 wherein a vapor space is in contact with the separated loaded solvent extractant phase and a non-oxidizing gas is supplied thereto to maintain a non-oxidizing atmosphere.

11. The process of claim 1 wherein the aqueous solution contains tetravalent vanadium and has a pH between about 1.4 and 3.0, and the organo-phosphorus compound is di-2-ethyl hexyl phosphoric acid.

12. The process of claim 11 wherein the aqueous solution contains substantially no ferric ion.

13. The process of claim 11 wherein an inert gas is supplied to the vapor space.

14. The process of claim 11 wherein a vapor space is in contact with the separated loaded solvent extractant phase and a non-oxidizing gas is supplied thereto to maintain a non-oxidizing atmosphere.

15. The process of claim 11 wherein the gas supplied to the vapor space is prepared by combustion of a carbonaceous fuel with air.

16. The process of claim 11 wherein the stripping agent is aqueous mineral acid.

17. The process of claim 11 wherein the aqueous solution contains substantially no ferric ion, a vapor space is in contact with the separated loaded solvent extractant phase and a non-oxidizing gas is supplied thereto to maintain a non-oxidizing atmosphere, the non-oxidizing gas is prepared by combustion of natural gas with air, and the stripping agent is aqueous sulfuric acid.

18. The process of claim 1 wherein the aqueous solution contains vanadium values as the desired metal values to be recovered and the organo-phosphorus compound is a dialkyl phosphoric acid ester.

References Cited by the Examiner

UNITED STATES PATENTS 2,767,045   10/56   McCullough _____ 23—14.5
2,860,031   11/58   Grinstead _____ 23—14.5

REUBEN EPSTEIN, *Primary Examiner.*

CARL D. QUARFORTH, SAMUEL BOYD, *Examiners.*